Figure 3:
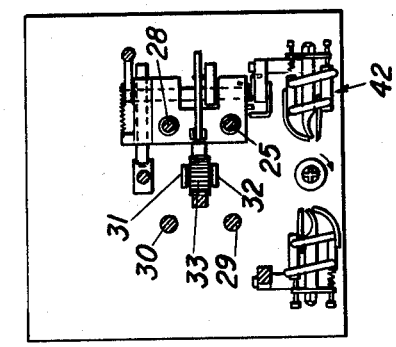

Feb. 23, 1960 T. F. MASON 2,925,839
EYE-REMOVING POTATO PEELING MACHINE
Filed Sept. 23, 1957 4 Sheets-Sheet 1

INVENTOR.
Thomas F. Mason
BY A. Schapps
Att'y

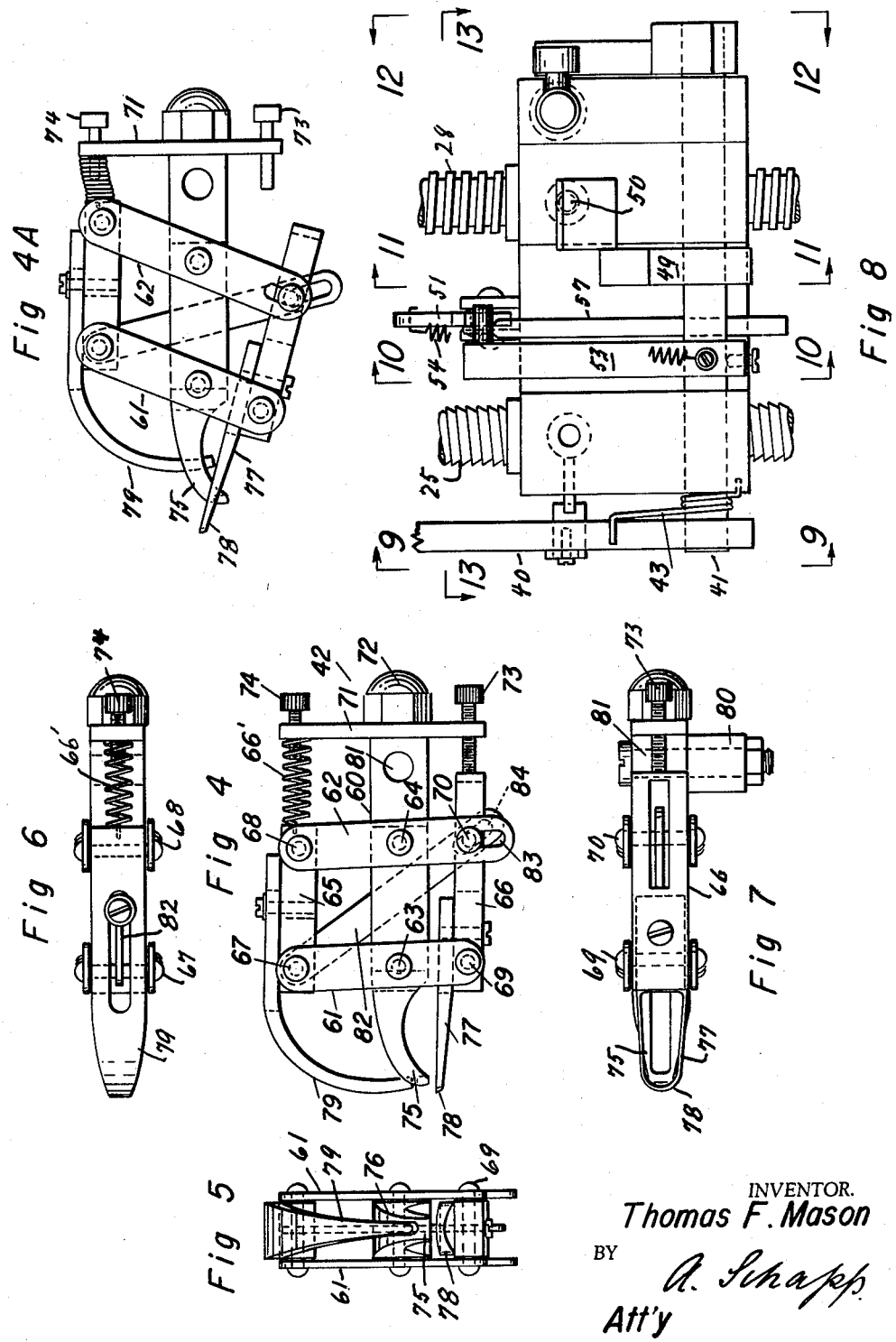

Feb. 23, 1960  T. F. MASON  2,925,839
EYE-REMOVING POTATO PEELING MACHINE
Filed Sept. 23, 1957  4 Sheets-Sheet 3
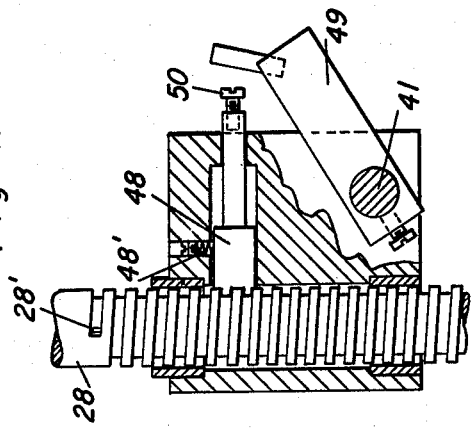
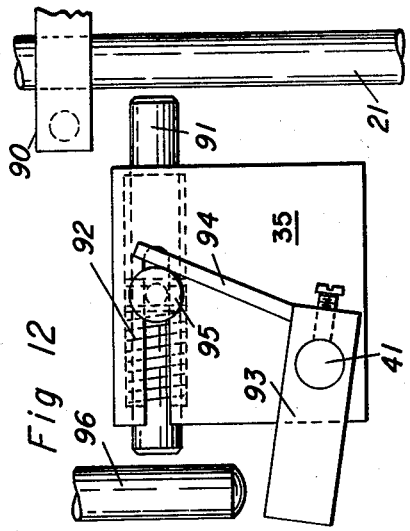
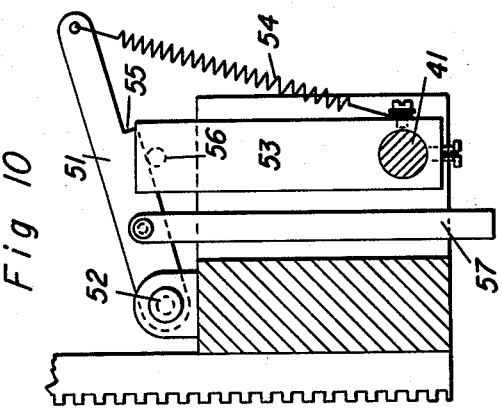
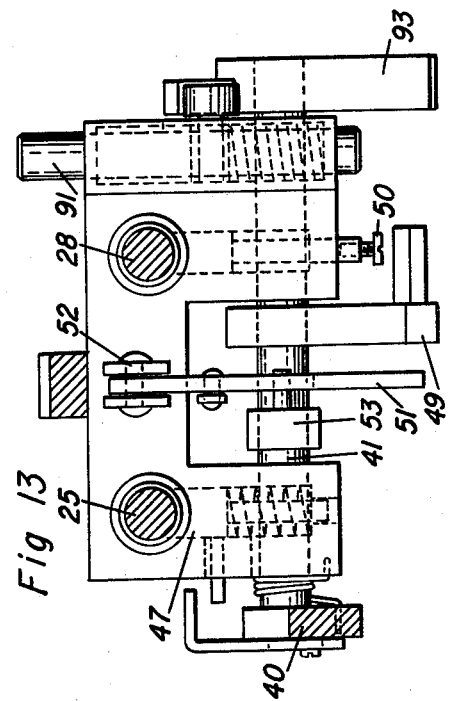
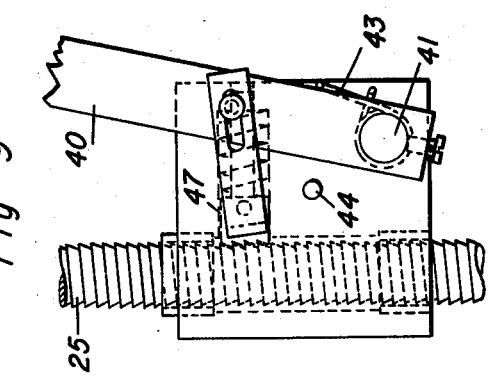
INVENTOR.
Thomas F. Mason
BY
A. Schapp
Att'y Feb. 23, 1960 T. F. MASON 2,925,839
EYE-REMOVING POTATO PEELING MACHINE
Filed Sept. 23, 1957 4 Sheets-Sheet 4

INVENTOR.
Thomas F. Mason
BY a. Schapp.
Att'y

United States Patent Office 2,925,839
Patented Feb. 23, 1960

2,925,839

EYE-REMOVING POTATO PEELING MACHINE

Thomas F. Mason, San Francisco, Calif.

Application September 23, 1957, Serial No. 685,606

3 Claims. (Cl. 146—43)

The present invention relates to an eye-removing potato peeling machine.

The principal object of this machine is to provide a machine of the character described in which potatoes are completely peeled in a single operation with a minimum of waste.

A further object of my invention is to provide a machine of the character described in which each potato is positioned automatically with respect to a central plane, and in which the potato is peeled simultaneously from opposite sides with the peeling heads starting at the center of the potato and each peeling head proceeding at a given rate towards the ends of the potato.

A still further object of the invention is to provide a means for rotating the positioned potato by means of special dual function chucks, which first peel the ends, then hold the potato to rotate it.

It is further proposed to provide a means for mounting the peeling heads to two carriages, which will provide a means for moving one peeling head in one direction and the other in the opposite direction, beginning at the center of the potato, uniformly.

Another object of my invention is to provide means for reducing the time for the carriage travel cycle to conform to the size of potato being peeled. This is accomplished by a feed take-over feature, which is automatic and as soon as the potato is peeled the feed is automatically accelerated to quickly finish the operation.

It is a further object of this invention to provide a machine of the character described with two special heads, each having several movable parts connected by linkage. The purpose of these heads is to control the movements of a special peeling blade by means of a spring-loaded pilot acting on fulcrum lever links against limit stops in one direction, and against the surface of the potato in the other direction.

In this connection, it is proposed:

a. To provide means for keeping the peeling head with its nose on the same vertical plane as the axis of the positioned potato, and retain that position regardless of the movement of the peeling head;

b. To provide a means for controlling the movements of the peeling blade by the spring-loaded pilot control;

c. To provide a means for completely peeling all the surface of the potato regardless of surface irregularities, and remove a continuous spiral peel of minimum thickness;

d. To provide a means for riding the peeling head nose with constant contact to the surface of the potato regardless of the movements of the pilot and the peeling blade;

e. To provide a means for auomatically and completely removing the eyes of the potato, and automatically limiting the depth of the peeling blade penetration to the depth necessary for removing each individual eye;

f. To provide means for automatically removing any rotten spots from the surface of the potato, and limiting the depth to which such rotten spots are to be cut;

g. To provide a means for instantly and automatically retracting the peeling blade to its normal position after it has removed an eye or rotten spot from the potato;

h. To provide a means for the peeling head pilot to automatically advance the peeling blade for a limited distance in a forward direction, and having advanced that set distance to then again advance the peeling blade in a forward and gradual upward motion;

i. To provide means for fulcrum advantage for the pilot for all of its control over the movements of the peeling blade;

j. To provide means for easily setting the adjustment controlling the thickness of peeling it is desired to remove;

k. To provide means for readily adjusting the control for the maximum depth the peeling blade is to attack eyes and rotten spots.

Further, I propose to provide means for automatically ejecting the potato immediately after it is completely peeled and while the machine is running and in the process of completing its cycle.

A still further object of the invention is to provide means for starting my machine and releasing its two peeling heads simultaneously and automatically by the moving of either carriage to its starting position.

And finally, it is proposed to provide means for automatically resetting the peeling heads in a retracted position and holding them in that position to enable the peeling heads to clear the next potato that is chucked, and to automatically disengage the carriage feeds, and automatically stop the machine at the end of the cycle.

Further objects and advantages of my eye-removing potato peeling machine will be apparent as the specification proceeds, and the new and useful features of this invention will be fully defined in the claims attached hereto.

Figure 2:
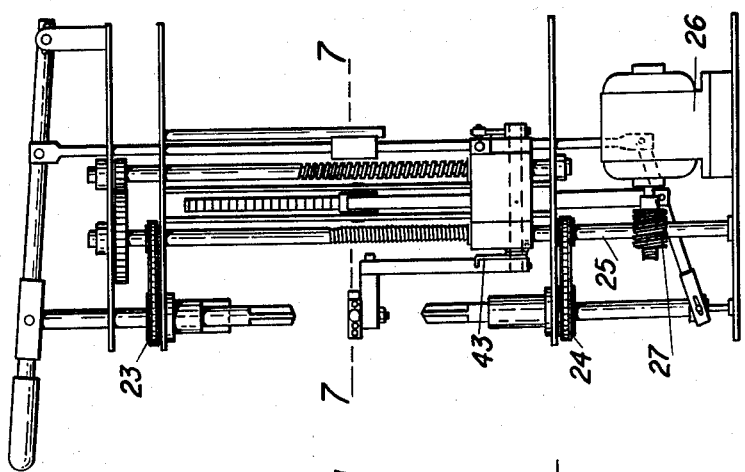
Figure 1:
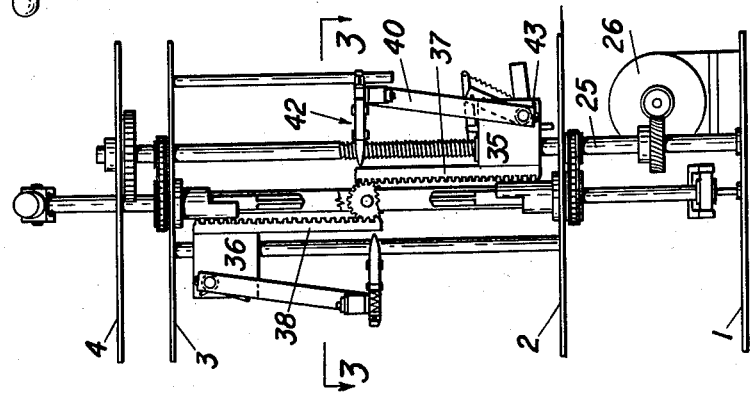
Figure 16:
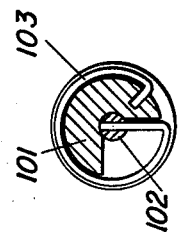
Figure 15:
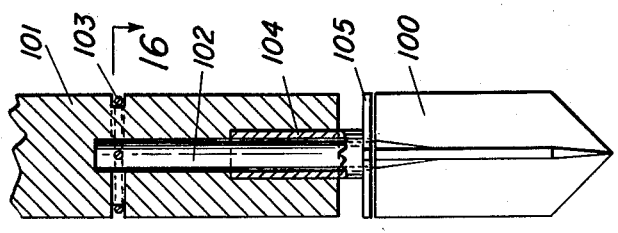
Figure 14:
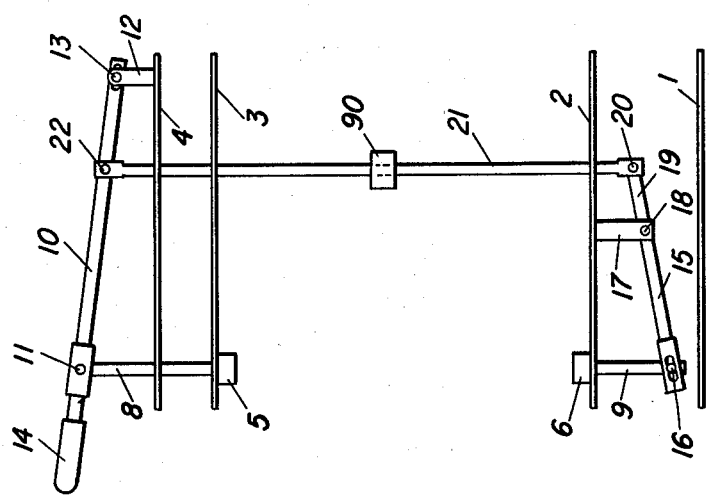

The preferred form of my invention is illustrated in the accompanying drawing, forming part of this application, in which:

Figure 1 shows a front view of the essential parts of my potato peeler;

Figure 2, a side view of the same;

Figure 3, a horizontal section taken along line 3—3 of Figure 1;

Figure 4, a plan view of a peeler head made in accordance with my invention;

Figure 4A, a similar plan view with the blade in extremely advanced position;

Figure 5, an end view of the same;

Figure 6, a front view of the peeler head;

Figure 7, a rear view of the same;

Figure 8, a side elevation of a control mechanism used in my invention;

Figure 9, an end view as seen from line 9—9 of Figure 8;

Figure 10, a section taken along line 10—10 of Figure 8;

Figure 11, a section taken along line 11—11 of Figure 8;

Figure 12, an end view as seen from line 12—12 of Figure 8;

Figure 13, a horizontal section taken along line 13—13 of Figure 8;

Figure 14, a schematic view of a chuck-operating mechanism used in my machine;

Figure 15, an axial section through a special form of chuck used in my machine; and Figure 16, a transverse section taken along line 16—16 of Figure 15.

While I have shown only the preferred form of my invention, I wish to have it understood that various changes or modifications may be made within the scope of the claims hereto attached, without departing from the spirit of the invention.

Referring to the drawing in detail, the operating mechanism of my potato peeler is mounted in a frame structure comprising four plates 1, 2, 3 and 4 arranged in parallel and horizontal relation by any suitable means, such as posts, not shown in the drawings.

In the front portion of the frame are arranged two chuck guides 5 and 6, the former projecting downwardly from plate 3 and the latter upwardly from plate 2, and the guides being in axial alinement vertically. The two guides are evenly spaced with respect to a central horizontal plane 7, which will be referred to later, see Figure 2.

Guides 5 and 6 have chucks 8 and 9 slidable therein, the upper chuck being suspended from the forward end of a lever 10, as at 11 and with limited freedom of sliding motion, the rear end of the lever being pivoted in a post 12 rising from the rear edge of the upper plate 4, the pivot being shown at 13. The front end of the lever projects beyond the frame structure and carries a handle 14.

The chuck 9 is carried by the forward end of a lever 15, at the sliding pivot 16, and the lever is pivoted, intermediate its length, in a block 17 depending from the plate 2, as at 18, and has an arm 19 projecting rearwardly beyond the pivot to a point substantially midway below the lever 10. The rear end of arm 19 is pivoted, as at 20, to a link 21, which in turn is suspended from the lever 10, as at 22.

Due to this linkage, when the handle 14 is depressed for depressing the chuck 8, the link 21 depresses the rear end of lever 15 and raises the lower chuck, the different parts of the linkage being adjusted to cause the chucks to proceed at uniform speed and to maintain the same distance with respect to the central plane 7. The sliding pivots 13 and 16 allow the chucks 8 and 9 to retain alined positions with their respective guides 5 and 6.

The confronting ends of the chucks are intended to receive a potato between the same lengthwise and the ends of the chucks are made to form cross-shaped blades adapted for ready penetration as the chucks are forced toward one another. It will thus be seen that, whenever a potato, of any size, is mounted between the two chucks, the horizontal central plane of the potato will coincide with the horizontal center 7, previously referred to.

Rotary motion is imparted to the two chucks through chain drives 23 and 24 connected to the main vertical shaft 25, which, in turn, receives power from the motor 26 through the worm drive 27.

The vertical shaft 25 is one of a set of four shafts arranged in the corners of a rectangle, the other three shafts being identified by the numerals 28, 29 and 30. Inside of the rectangle are two supporting posts 31 and 32, which have a pinion 33 revolvably mounted between the same. The shafts 25 and 26 are mounted to the right of the pinion and the shafts 29 and 30 to the left of the pinion, as seen in Figure 3.

Each pair of shafts has a block 35—36 slidable thereon and these two blocks form part of two peeling units designed to peel the rotating potato simultaneously, both beginning in the central plane 7, and one moving upward, while the other moves downward.

The two blocks are interconnected for driving movement in opposite directions by two rack rods 37 and 38, both of which are in driving engagement with the pinion 33. The right block receives its vertical motion from the drive shaft 25 or the drive shaft 28, while the left block is driven by the right block through the rack rods and the pinion 33.

Since the operating features of the two peeling units are substantially the same, only the right unit will be described for the present.

This unit comprises the block 35 previously described, an arm 40 secured upon a horizontal shaft 41 pivoted in the block and made to project upwardly on a slight outward incline, and a peeler head 42 mounted upon the upper end of the arm 40.

The upper end of the arm is urged toward the chucks by a spring 43, and is limited in its movement by a small post 44 projecting forwardly from the block to the left of the arm. It is made to operate a spring-pressed plunger 47 adapted for engagement in the thread of the drive shaft 25, see Figure 9. The latter thread is of the type known as a buttress thread having a flat top face and an inclined bottom face, so that as long as a plunger rides on the flat upper surface it will be lifted by the thread, but when the plunger is lifted by some other agency for acceleration, it is free to ratchet over the thread.

Plunger 47 is spring-loaded to keep it in operative position and to momentarily disengage as it ratchets over the buttress threads of member 25 and is disengaged by arm 40 as it is moved backwards and locked at the completion of the cycle.

In the present instance, it is proposed to speed up the movement of the peeling unit after a potato is completely peeled, and for that purpose a second drive is contemplated involving the second shaft 28 of the right pair. This shaft is formed with a regular acme thread of steeper pitch which is engaged by a plunger 48 slidable in the block, this plunger being normally out of engagement with the thread but being shaped to be forced into engagement by an arm 49 secured upon the shaft 41 and made to bear on a screw 50 secured upon the plunger when the main arm 40 is swung inwardly due to the fact that the peeling head has finished its cut and meets no opposition from the potato toward its inward swing, which is only limited by the post 44.

The plunger 48 is frictionally held in any position to which it may have been positively adjusted by means of a spring 48' and is forced out of engagement with the thread by a cam 28' at the upper end of the thread.

Thus, the peeling unit is advanced slowly as long as the peeling operation lasts, and moves toward end position quickly as soon as the peeling operation is finished.

The main arm 40 holding the peeling head normally tends to place the head close to the chucking members, but may be held in spaced relation to clear a positioned potato on an idling downward movement by means of a link 51 (see Figure 10), pivoted to the block, as at 52 and bearing down on an arm 53 fixed to the shaft 41 through a spring 54.

The lower face of link 51 is notched, as at 55. Thus, when the arm 53 is swung to the right, which movement would correspond to a rearward swing of the peeling head, the notch 55 catches behind a transverse pin 56 in the arm and locks the latter in its rearward position.

The link 51 has a rod 57 projecting downwardly therefrom and this rod projects downwardly below the bottom face of the block and is made to release the locking engagement when striking the plate 2, so as to allow the arm 53 to swing back to the identical position as far as allowed by the intervening potato.

Thus, after the peeler head is moved upward into an out-of-the-way position, the head will be close to the chucking device. But, when rod 96 (Figure 12) meets arm 93, shaft 41 is rotated so that arm 51 will automatically operate and lock at 55—56 (Figure 10). Since arm 40 is connected to shaft 41, it also will be retracted automatically.

When the potato has been positioned, the operator presses downward on the head, which is now in potato-clearing position and moves the head toward the central plane. As soon as the unit reaches the end of its travel, that is plane 7, the rod 57 strikes the underlying plate and releases the arm 53 and allows the peeler head to move into contact with the potato.

One of the peeler heads is illustrated in detail in Figures 4 to 7, inclusive; Figure 4 showing a plan view of the same. It comprises a central bar 60, a pair of levers 61—62 pivoted thereto in spaced relation, as at 63—64, and a pair of links 65—66 pivoted to the ends of the levers, as at 67—68—69 and 70, so as to form a parallelogram therewith.

A rear bar 71 is fixed upon the main bar 60 by means of a screw 72, and the link 65 is urged forward by a spring 66', bearing upon the rear bar, the forward movement being limited by a screw 73 threaded into the rear bar and bearing on link 66. A second screw 74 threaded into the rear bar and extending into the spring 66' is adjustable for limiting the rearward movement of link 65.

The main bar 60 has a nose 75 extending beyond the link 61, this nose being intended to ride on the surface of the rotating potato, and being rounded and preferably about one-eighth of an inch in width. It is slotted longitudinally, as shown at 76 to allow the pilot member to be described later, to play therein.

The link 66 has a blade 77 projecting forwardly therefrom, the blade being slotted for free play about the nose and terminating in a semi-circular knife edge 78 normally slightly ahead of the nose and disposed on a forward incline, as shown, so as to cut a thin slice from the circumference of a rotating potato when the nose is pressed upon the latter.

The link 65 carries a pilot member 79 which extends in a sweeping curve toward the nose and is adapted to ride in the slot formed in the nose. This pilot is rather narrow and its function is to guide the blade into the proper cutting position with respect to the potato surface.

It will be noted that the spring 66' and the screw 73 naturally hold the assembly in the position shown. The main bar 60 is secured upon the upper end of the arm 40 by means of a bolt 80 extending through the opening 81 in the bar and a corresponding opening in the arm which latter is urged toward the rotating potato by the spring 43, the pressure of which is intended to be about twice that of the spring 66'.

As long as the surface of the potato is relatively smooth, the peeling head will ride over the surface substantially in the position shown in Figure 4. The pilot member will be crowded back slightly, advancing the blade while the nose is in sliding contact. The distance between the blade and the nose determines the depth of the cut.

As an eye in the potato passes the peeling head, the nose, which is subject to the main spring pressure follows the contours of the eye cavity and the pilot member, striking the far edge of the eye, is forced backward, causing the blade to advance into the eye in proportion to the depth of the eye for entirely removing the same.

It will be noted, in this connection, that the linkage at 61—62 favors the pilot member as against the blade member, so that the pilot member will readily retract against the pressure of spring 66' for holding the nose in contact with the eye and for advancing the blade into the eye cavity. On the other hand, after the eye has been removed and extra pressure has been relieved, the spring 66' again due to the favorable linkage, will readily draw the blade back to normal position.

The width of the nose is such that it will ride on a firm potato without digging into it, but at the same time, it is sufficiently narrow to allow the main spring 43 to push the nose into any soft or rotten spot in the potato. When it penetrates into any soft spot, the pilot is pushed back and the blade is moved forward, so as to cause the latter to cut out the bad spot.

In this connection, attention is called to the provision of the special diagonal link 82 which is intended to cause a sharp upward incline of the blade in the case of an extremely deep cut. This upward feature of the blade comes into play also when peeling potatoes which are narrow and flat.

The link 82 is pivoted, at one end, to the pivot 67 and, at the other end, to the pivot 70. At that pivot the lever 62 is formed with a slot 83, and the link 82 with a slot 84, both of these slots playing about the pin as follows:

In normal position the pin 70 is near the upper end of the slot 83 and in an intermediate portion of the slot 84, depending upon the position of the screw 73. During normal operation, the pin will remain near the upper portion of the slot 83 and will play in the other slot, as long as it has freedom to play, while the blade supporting link 66 keeps playing in substantially rectilinear direction.

But, in case of an extreme retraction of the pilot member, when the pin 70 reaches the upper end of the slot 84, it cannot go any further and causes the diagonal member 82 to swing the pin 70 downwardly into the slot 83, with the result that the link 66 swings downward on pivot 69 and the blade swings upward for a deeper cut and for quicker recovery when the nose once more reaches a firm surface of the potato. The extreme forward and upward position of the blade is illustrated in Figure 4A.

The details of the de-chucking device, that is the means for freeing each potato at the end of the peeling operation, are disclosed in Figure 12 as comprising an abutment 90 mounted on the link 21 of the chuck mechanism, a bolt 91 slidable in the block 35 and having one end normally projecting to a point underneath the abutment under the pressure of a spring 92 and releasing means for the bolt.

The latter means comprise a bar 93 secured upon the shaft 41, an arm 94 projecting from the bar and bearing and a head 95 projecting sidewise from the bolt and a fixed post 96 depending from plate 3 and adapted to stop the advance of the free end of the bar 93, so as to push the bolt 91 outward over the opposition of spring 92.

In operation, as the bolt 91, in its upward travel reaches the abutment 90, is raises the latter and link 21. Link 21 raises lever 10 (see Figure 14) and lowers the front arm of lever 15, thereby pulling both of the chucks out of the potato held therebetween.

In the general operation of my machine, after the potato has been positioned in the chucking device, the two peeling units are brought opposite the middle portion of the potato from opposite sides. The motor is suitably controlled to start automatically when the peeling heads are moved to starting position, and to stop automatically when the operation is finished.

The starting of the motor will rotate the two chucks and the potato held therebetween, and the two peeling heads will be made to slowly advance in opposite directions due to the drive by the buttress thread of shaft 25. Thus, each of the peeling heads will remove a spiral slice from the surface of the potato, the speed being regulated, of course, to make the spiral cuts contiguous, so as to remove the potato peeling completely.

At the same time, as has been previously described, the peeling heads are constructed to completely remove the eyes of the potatoes and soft spots encountered in the surface thereof.

It should further be noted that, due to their mounting on the swinging arms under spring pressure, the peeling heads are made to bear on the potato surface under substantially the same pressure regardless of the thickness of the potato, since potatoes are larger in their middle portions and taper toward both ends. The swinging arms allow the peeling heads to maintain substantially perpendicular relation with respect to the contour of the potato at all times. If, for instance, the peeling head starts in substantially horizontal position where the potato is the widest, it will swing into angular position as the diameter of the potato decreases, thus maintaining a state of perpendicularity throughout the operation.

As soon as the operation is finished, both peeling heads are free to swing toward the axis of rotation, and as a result the shaft 28 with its acme thread takes over the drive in the manner previously described, for speeding up the cycle operation.

At about the same time the bolt 91 pushes up on the abutment 90, thus lifting the link 21 and freeing the chucks from the potato and allowing the latter to drop out of the machine.

Referring to Figure 14, the chuck guides 5 and 6 provide means for completely receiving all of the chucks, thereby freeing the potato from whichever chuck it has adhered to when the chucks are drawn apart.

Figure 15 illustrates a special form of chuck assembly intended particularly for shearing the ends of potatoes prior to the main peeling operation. In this form, the chuck 100, which has four radial blades, is revolvably mounted in the holder 101 by means of a stem 102 extending into the holder, the rotation being limited to a quarter of a turn by means of a spring 103.

Surrounding the stem is a fixed tube 104 which carries four radial shear blades 105 in close proximity to the radial blades of the chuck. The spring 103 normally holds the shear blades in alignment with the chuck blades, but allows of a rotary movement through a quarter of a turn of one set of blades with respect to the other set.

In operation, with the sets of blades in alinement, the potato is inserted, with the top of the potato projecting slightly above the shear blades. As the holder 101 begins to turn, the weight of the potato offers sufficient inertia and resistance to allow the shear blades 105 to first sever the top of the potato before rotary motion is transmitted to the main body of the chuck for rotating the potato.

After the potato is de-chucked, the chuck returns to its original position by its spring tension.

I claim:

1. In a potato peeling machine, a peeler head comprising a nose piece adapted for riding on the surface of a rotating potato and having spring means for urging the same upon the potato, a pilot member, a blade member, and linkage connecting the said two members to the nose piece to cause the pilot member to lead the nose piece and the blade to trail the nose piece, the pilot member being operative, through said linkage to maintain the blade in peeling relation to the nose piece, and the pilot member having spring means urging the pilot member upon the potato, and the nose piece being made of a width to ride on a firm potato surface but to penetrate a soft spot in the potato surface for deeper penetration of the blade thereinto, and the linkage including diagonal connecting means operative to change the angularity of the blade for a deeper cut to facilitate retraction from said cut when the pilot again strikes a firm surface.

2. In a potato peeler of the character described, a pair of chucks mounted in vertically opposing relation and movable toward and away from each other in equidistant relation to a central plane, the chucks being operable to clamp upon a potato lengthwise so as to center the potato with respect to said central plane, means for uniformly rotating the chucks and the potato, and a pair of peeling units bearing on the potato at opposite sides and operable for peeling the potato from said central plane to opposite ends thereof, each peeling unit comprising a nose member adapted to bear on the rotating potato, a blade member following the nose member for peeling the potato, a pilot member forward of the nose member and connections between the three members operative to cause the pilot member to actuate the blade member to follow the contour of the potato and to completely remove the eyes from the surface of the potato, the said connections including a diagonal control member operative for changing the angularity of the blade member in response to severe changes in the said contour of the potato.

3. In a peeling machine of the character described, a peeling unit comprising a central bar having a nose at one end and a cross-bar at the other end, a pair of levers pivoted upon an intermediate portion of the bar in spaced relation from one another, a link pivoted to the levers rearwardly of the bar and having a blade extending to normally project sidewise beyond the nose, a second link pivoted to the levers forwardly of the bar and having a pilot member normally projecting sidewise forwardly of the nose, a spring bearing on the cross-member and the second link and tending to sidewise advance the pilot member and to retract the blade member, and means for limiting the retracting movement of the blade member, the links having diagonal connecting means operative to change the angularity of the blade member on a severe sidewise thrust of the latter.

References Cited in the file of this patent

UNITED STATES PATENTS

| | | |
|---|---|---|
| 273,125 | Moffat | Feb. 27, 1883 |
| 759,264 | Glasser | May 10, 1904 |
| 1,579,771 | Kools | Apr. 6, 1926 |
| 1,850,633 | Mehserle | Mar. 22, 1932 |
| 2,192,340 | Comfort | Mar. 5, 1940 |
| 2,521,987 | Mason | Sept. 12, 1950 |